United States Patent [19]

Honer et al.

[11] 3,943,004

[45] Mar. 9, 1976

[54] LEAD CHLORIDE ELECTRODE FOR SEAWATER BATTERY

[75] Inventors: Harold Nickolas Honer, Raleigh, N.C.; Francis P. Malaspina, Yardley; William J. Martini, Fairless Hills, both of Pa.

[73] Assignee: ESB Incorporated, Philadelphia, Pa.

[22] Filed: Feb. 25, 1975

[21] Appl. No.: 552,950

[52] U.S. Cl. ............................ 136/100 M; 136/112
[51] Int. Cl.² ......................................... H01M 6/00
[58] Field of Search ........................... 136/112–114, 136/100 M, 100 R, 26

[56] References Cited
UNITED STATES PATENTS

| | | | |
|---|---|---|---|
| 2,597,452 | 5/1952 | Coleman et al. | 136/100 M |
| 3,468,710 | 9/1969 | Krasnor et al. | 136/26 |
| 3,481,790 | 12/1969 | Duddy | 136/100 M |
| 3,785,871 | 1/1974 | Schikawa | 136/100 M |

*Primary Examiner*—T. Tung
*Assistant Examiner*—C. F. LeFevour
*Attorney, Agent, or Firm*—Wm. Wharton Smith; Robert H. Robinson; Anthony J. Rossi

[57] ABSTRACT

A primary seawater battery employs a metallic sheet anode and a sheet cathode. The cathode is lead chloride including an addition of about 1 to about 10 parts by weight of lead oxide per 100 parts by weight of lead chloride. The lead oxide may be litharge, litharge containing lead, red lead or lead peroxide. Other ingredients which may be present in the cathode are carbon black for conductivity and an organic binder such as polyfluoroethylene. The battery is characterized by having a shortened rise time compared to batteries without the lead oxide additive, especially when the battery is used at low temperatures.

6 Claims, No Drawings

LEAD CHLORIDE ELECTRODE FOR SEAWATER BATTERY

BACKGROUND OF THE INVENTION

1. Field of the Invention

This invention relates to the field of electrogalvanic batteries. In particular, it relates to primary batteries having cathodes containing lead chloride and which are activated by immersion in seawater.

2. Description of the Prior Art

Primary, i.e. single discharge, batteries using lead chloride cathodes with metallic anodes such as magnesium or zinc are known in the battery art. In one application, such batteries provide a convenient source of power for various sorts of electronic apparatus used for monitoring underwater sound. A particularly favorable feature of these batteries is that they will operate using seawater as the electrolyte. The batteries are activated simply by immersion in a conductive aqueous solution such as seawater thereby eliminating the need for any electrolyte storage and dispensing devices.

It has been usual practice to have the seawater battery fully connected to its load at the time of immersion. In normal battery design, it may require one or more minutes for the battery to reach operating voltage. This is particularly true when the battery, the electrolyte or both are at a low temperature. Often the discharge is planned to last for several hours so that a delay of a minute or so between immersion and the attainment of working voltage is of little importance. However, in a certain class of device, it is important that the battery reach a useful voltage under a considerable load within a fraction of a minute and under adverse temperature conditions. Lead chloride seawater batteries of prior art design do not activate rapidly at low temperatures.

Seawater batteries are known using anodes of sheet magnesium, sheet zinc and sheet aluminum. It is also known that alloys of these materials offer improved characteristics compared to pure metals. The magnesium group offers the highest cell voltages.

A cathode for a seawater battery has been disclosed in the prior art wherein lead powder is mixed with lead chloride and a small quantity of graphite and the combination hot pressed onto a copper mesh grid or conductor. The purpose of the lead powder addition is to act as a binder to hold the lead chloride in place on the copper screen. Cathodes made in this manner have superior voltage rise time characteristics after a storage period when compared to cathodes made with plastic binders. The voltage rise time improvement is believed to be due to the protection during the storage period of the copper mesh by lead particles in the cathode mix. The recommended ratio of lead powder to lead chloride in this prior art cathode is 30 parts by weight lead powder to 70 parts by weight of lead chloride. Mixes having a lower ratio of lead powder to lead chloride down to 10 parts lead to 90 parts lead chloride are also disclosed in the prior art.

Polyfluoroethylene (PFE) has been added to many types of galvanic electrodes. It was first used in gas electrodes to give the electrode surface anti-wetting properties. Subsequently, it has also been added as a binder to electrodes used in the fully submerged state. The material has been shown to be a better binder for immersion electrodes than the older plastics such as the polystyrenes, polyolefins, methacrylates, etc. Electrodes containing polyfluoroethylenes can be discharged at higher rates than electrodes with the other plastic binders mentioned. The most commonly used polyfluoroethylene is polytetrafluoroethylene (PTFE), however, it has been shown that other polymerized halogenated ethylenes containing fluorine have similar properties. Therefore, the term polyfluoroethylene is used in this specification in a generic sense to include all such compounds.

SUMMARY OF THE INVENTION

A seawater battery comprises a metallic anode and a cathode having an active material of lead chloride containing a small portion of lead oxide. The lead oxide may be litharge (PbO), litharge containing lead and the lead is about 20% to 30% of the lead-lead oxide mixture, red lead ($Pb_3O_4$) or lead peroxide ($PbO_2$). The ratio of lead oxide to lead chloride may vary between about 1 part by weight lead oxide and 100 parts by weight lead chloride and about 10 parts lead oxide to 100 parts lead chloride. A preferred range is from 2 to 3 parts by weight lead oxide to 100 parts lead chloride. Other ingredients in the cathode may include carbon powder up to about 15% as a conductivity agent and a binder such as polyfluoroethylene (PFE), up to about 5%.

In a preferred method of making the cathode mix for the battery of the invention, the several ingredients needed for the cathode are blended and then extruded in sheet form as with an extruder or with calender rolls. The sheet so obtained is cut to size and a metal mesh grid is cold pressed therein to provide a completed cathode.

It will be seen that the cathode of the present invention differs from the prior art in the addition of lead oxide to the lead chloride cathode mix. The lead oxide addition has been found to materially reduce the activation time of lead chloride cathodes upon immersion, particularly when the solution (seawater) in which it is immersed is at a low temperature (i.e. near 0°C.). The three common oxides of lead, litharge, red lead and lead peroxide, all act to reduce the activation time of lead chloride. Red lead appears to have the least effect weight for weight of the three oxide types. It has been found that leady lead oxide (i.e. litharge containing lead), a material used in great quantity in the battery industry, also provides the beneficial effect, and it is to be included in the term lead oxide as used in this specification and claims.

The amount of the lead oxide addition is preferably about 1 to 10 parts per 100 parts by weight of the lead chloride. This differs substantially from the prior art use of lead powder in lead chloride cathodes where the optimum ratio of lead to lead chloride is shown to be 30:70 or 30% of the total mix weight. The lead powder addition of the prior art is largely inert so that the electrode containing it has a large quantity of a heavy, nonactive filler. In the present invention, the lead oxide is present in smaller quantities, and it can be discharged whereby it adds to the total electrical output of the cathode.

The cathode of the present invention is characterized by having a rapid rise in voltage upon immersion in seawater, even after long storage periods, adverse temperature and humidity conditions, and under a heavy electrical load at the time of activation.

EXAMPLE 1

Ten 16-cell lead chloride/magnesium seawater batteries were built. Each cell contained one magnesium anode approximately 57 mm × 76 mm × 0.25 mm and one lead chloride cathode 55 mm × 74 mm × 1.25 mm. The cathode of each cell comprised a cathode mix sheet with an expanded copper mesh screen embedded therein. The plates were spaced apart by means of a number of polyethylene spacers adhered to the anodes. Other plate spacing means such as woven or nonwoven fabrics are equally suitable. To manufacture the cathodes of all batteries of the test, a mix was made of the ingredients listed. This mix was prepared in a kneeder-blender having provision for heating the blades. Each mix comprised the active materials, carbon black to act as electrical conductor, polytetrafluoroethylene to act as a binder and a water soluble wax to serve as a lubricant for the mixing and blending operations. The amount of carbon black can go up to 15% or so, however, about 10% by weight of the total mix was used in the examples. The binder was added as a 50% water emulsion. The exact amount is not critical, about 1½% was used in the examples. About 3% of water soluble wax was used. The wax may be removed by soaking in water any time after the sheet has been taken from the calender. Its removal will increase the porosity of the lead chloride material. However, in the present instance, the wax was not removed as its removal did not make any improvement in performance in the tests under study.

The electrode preparation included the following steps:

1. Mix ingredients in a kneeder-blender at room temperature until completely mixed (10 minutes for the mixes listed below);
2. Partially dry by heating the blades of the kneeder-blender (about 15 minutes at 100°C.);
3. place on calender with rolls heated to about 100°C. and sheet out, thickness about 1¼ mm.;
4. Cut the sheet into biscuits having dimensions as listed above;
5. Press expanded copper mesh into the lead chloride sheet at room temperature.

The cathodes of the first battery were prepared from a mix comprising:

| | |
|---|---|
| $PbCl_2$ | 1816 gms. |
| carbon black | 216 gms. |
| water soluble wax | 84 gms. |
| polytetrafluoroethylene | 35 gms. |

The cathodes of the second battery were prepared from a mix comprising:

| | |
|---|---|
| PbO | 1816 gms. |
| carbon black | 216 gms. |
| water soluble wax | 84 gms. |
| polytetrafluoroethylene | 35 gms. |

The cathodes of the third battery were prepared from a mix comprising:

| | |
|---|---|
| $PbCl_2$ | 1816 gms. |
| carbon black | 216 gms. |
| PbO (lead monoxide) | 50 gms. |
| water soluble wax | 84 gms. |
| polytetrafluoroethylene | 35 gms. |

The cathodes of the fourth battery were the same as those of the third battery except that the amount of lead monoxide was 100 gms. The cathodes of the fifth battery were prepared from a mix comprising:

| | |
|---|---|
| $PbCl_2$ | 1816 gms. |
| carbon black | 216 gms. |
| PbO + Pb (leady oxide) | 50 gms. (containing about 12 gms lead) |
| water soluble wax | 84 gms. |
| polytetrafluoroethylene | 35 gms. |

The cathodes of the sixth battery were the same as those of the fifth battery except that the amount of leady lead oxide was 100 gms. (containing about 24 gms. of lead).

Leady lead oxide is a material having extremely wide useage in the lead-acid storage battery art. In one method of preparation, it is prepared by the attrition of lead balls in a rotating ball mill into which a regulated stream of air is permitted to flow. A powder results from this operation which can run from about 50 to 70 percent lead monoxide and the remainder lead. It can be further oxidized by additional heating and attrition in the presence of air.

The cathodes of the seventh battery were prepared from a mix comprising:

| | |
|---|---|
| $PbCl_2$ | 1816 gms. |
| carbon black | 216 gms. |
| $PbO_2$ | 16 gms. |
| water soluble wax | 84 gms. |
| polytetrafluoroethylene | 35 gms. |

The cathodes of the eighth battery were the same as those of the seventh battery except that the amount of lead peroxide was 50 gms. The cathodes of the ninth battery were the same as those of the seventh battery except that the amount of lead peroxide was 100 gms.

The cathodes of the tenth battery were prepared from a mix comprising:

| | |
|---|---|
| $PbCl_2$ | 1816 gms. |
| carbon black | 216 gms. |
| $Pb_3O_4$ | 50 gms. |
| water soluble wax | 84 gms. |
| polytetrafluoroethylene | 35 gms. |

The physical dimensions of all 10 batteries were the same.

The terminals of each battery were connected in series to an ammeter shunt and a 0.1 ohm resistor. Each battery was stored 50 hrs. at −20°C. Each battery was then immersed in a 1.5% saline solution at 0°C. The battery current was read with respect to time. The objective of the test was to produce a current of 3 amperes through the 0.1 ohm load within 45 seconds. The results were:

| Battery | Cathode | Time to Reach 3 amps | Current at 45 Seconds |
|---|---|---|---|
| 1 | all $PbCl_2$ | 85 seconds | 2 amps |
| 2 | all PbO | (did not reach 3 amps) | 2 amps |

| Battery | Cathode | Time to Reach 3 amps | Current at 45 Seconds |
|---|---|---|---|
| 3 | $PbCl_2$ + 50 gms PbO | 15 seconds | 3 amps |
| 4 | $PbCl_2$ + 100 gms PbO | 26 seconds | |
| 5 | $PbCl_2$ + 50 gms leady oxide | 18 seconds | 4 amps |
| 6 | $PbCl_2$ + 100 gms leady oxide | 20 seconds | |
| 7 | $PbCl_2$ + 16 gms $PbO_2$ | 70 seconds | |
| 8 | $PbCl_2$ + 50 gms $PbO_2$ | 13 seconds | 4 amps |
| 9 | $PbCl_2$ + 100 gms $PbO_2$ | 15 seconds | |
| 10 | $PbCl_2$ + 50 gms $Pb_3O_4$ | 43 seconds | |

From this test the following conclusions can be drawn:

a. neither a battery using a lead chloride mix (battery 1) nor a battery using litharge mix (battery 2) met the desired activation requirement;

b. batteries using a lead chloride mix with about 2.7 parts by weight (50 gms.) of either litharge (battery 3), leady lead oxide (battery 5), red lead (battery 10) or lead peroxide (battery 8) per 100 parts by weight of lead chloride met the activation requirement. However, of the addition agents, red lead gave the least improvement and lead peroxide gave the greatest improvement;

c. a battery having less than 1 part by weight of lead oxide (battery 7) was not as good as a battery having about 2.7 parts (battery 8);

d. batteries having about 5.5 parts by weight of lead oxide (batteries 4, 6 and 9) were not as good as the batteries with about 2.7 parts by weight.

In summary, the addition of a small amount of lead oxide to a lead chloride mix gives a cathode which will meet a difficult activation requirement without sacrifice in electrical capacity.

Although the testing outlined above is directed to a particular battery design and a particular test regime, the invention relates to the generalized class of lead chloride seawater batteries and is applicable to all such batteries.

Having completely described our invention and given examples of its utility, we now claim:

1. A seawater battery which comprises a metallic anode, a cathode and a means for separating the cathode from the anode, the cathode comprising active material mix and a grid, the active material mix comprising lead chloride and lead oxide wherein the ratio of lead oxide to lead chloride is within the range of about 1 part by weight lead oxide to 100 parts by weight lead chloride and about 10 parts by weight lead oxide to 100 parts by weight lead chloride.

2. A seawater battery as defined in claim 1 wherein the ratio of lead oxide to lead chloride ranges from about 2 to 3 parts by weight lead oxide per 100 parts by weight lead chloride.

3. A seawater battery as defined in claim 1 wherein the active material mix of the cathode contains carbon black and polyfluoroethylene.

4. A seawater battery as defined in claim 1 wherein the lead oxide is (PbO).

5. A seawater battery as defined in claim 1 wherein the lead oxide is $PbO_2$.

6. A seawater battery as defined in claim 1 wherein the lead oxide is a mixture of PbO and lead and the lead is about 20% to 30% of the lead-lead oxide mixture.

* * * * *